Sept. 28, 1943.   W. A. KENDALL   2,330,591
FIXTURE AND MOUNTING BRACKET THEREFOR
Filed Aug. 5, 1941
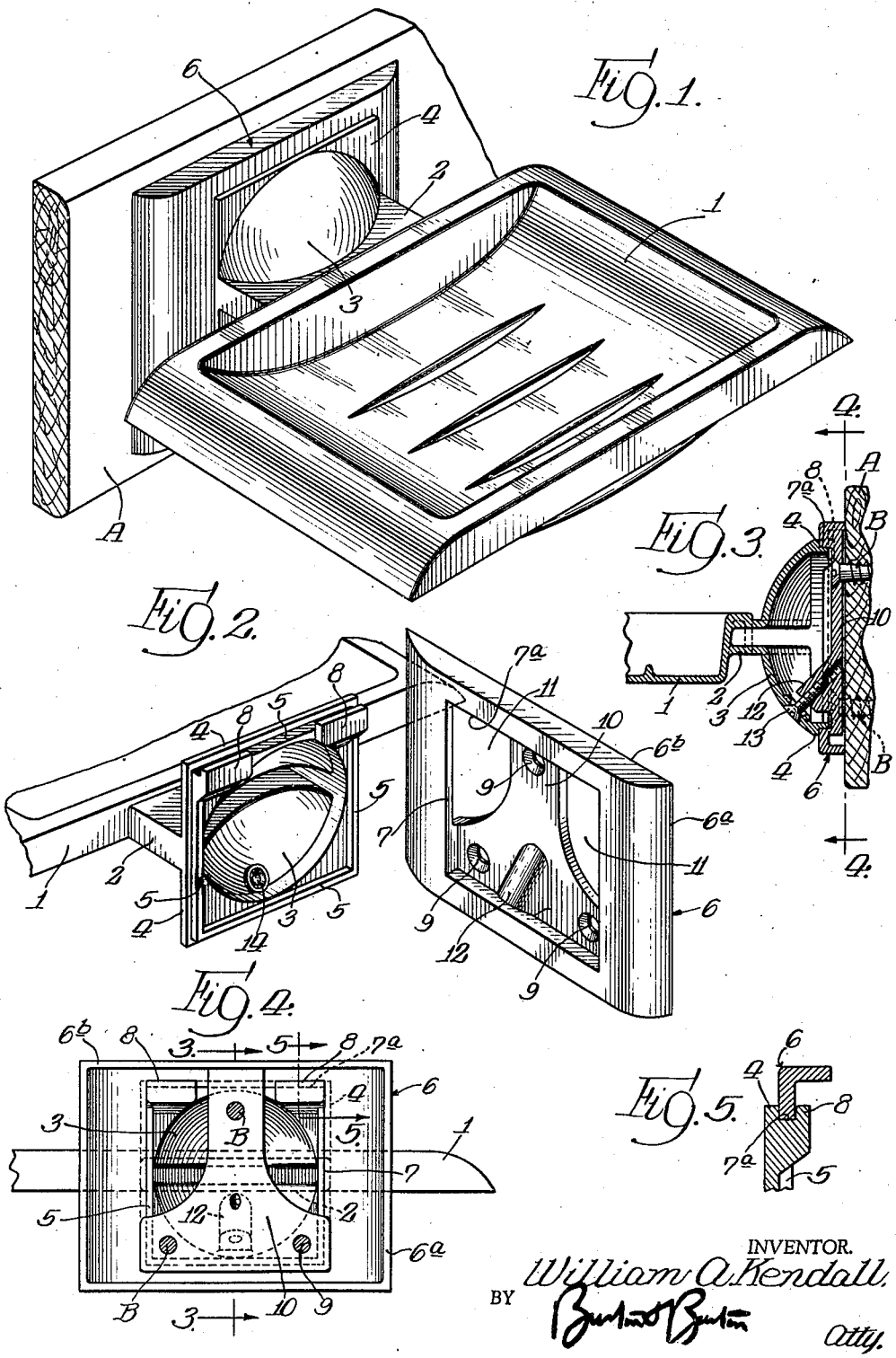
INVENTOR.
William A. Kendall
BY
Atty.

Patented Sept. 28, 1943

2,330,591

UNITED STATES PATENT OFFICE 2,330,591

FIXTURE AND MOUNTING BRACKET THEREFOR

William A. Kendall, Hinsdale, Ill.

Application August 5, 1941, Serial No. 405,507

2 Claims. (Cl. 248—223)

This invention relates to fixtures and mounting brackets, particularly of the type which are mounted upon vertical surfaces such as walls, moldings, fixture rails and the like. These fixtures are frequently included in household appointments for bathrooms and kitchens.

One object of the invention is to provide a twopart bracket structure comprising a mounting plate which can be first secured to the supporting surface, and a separable bracket element formed for interengagement with the mounting plate so as to require only a single fastening element to complete securement of the fixture with which the bracket is associated.

Another object is to provide a two-part bracket structure having a mounting plate adapted to be secured by screws or like fastening members to a supporting surface and a bracket element interengageable with the mounting plate in a manner to conceal the fastening members.

A further object is to provide a fixture which includes a separable mounting plate and an integral bracket element interengageable with the mounting plate, both parts being designed for economical production in quantity, and with a view to ease of installation.

Other objects and advantages will appear from the following description taken in connection with the drawing in which:

Figure 1 is a perspective view showing a fixture and its mounting bracket constructed in accordance with this invention and installed in a position for use.

Figure 2 is a perspective view showing the mounting plate and the bracket element disengaged from each other, the fixture which is in the nature of a soap dish being partly broken away.

Figure 3 is a vertical sectional view showing the mounting plate and bracket element in assembled relation and taken as indicated at line 3—3 on Figure 4.

Figure 4 is a rear elevation of the assembled bracket and mounting plate taken at the plane indicated at line 4—4 on Figure 3.

Figure 5 is a detail section taken as indicated at line 5—5 on Figure 4.

While I have shown in the drawing and shall herein describe in detail a preferred form of my invention, it is to be understood that I do not intend to limit the invention to the specific form or application disclosed, but aim to cover all modifications and alternative constructions falling within the spirit and scope of the invention as expressed in the appended claims.

The mounting bracket structure which is the subject of this invention should be understood as applicable to a variety of fixtures such as, for example, soap dishes, tumbler holders, toothbrush racks, towel rod supports and other accessories commonly employed in kitchens or bathrooms. These devices are usually fastened in place by securing screws which extend directly into the wall or into a mounting rail or molding provided for the purpose; but in most cases the mounting brackets are simply apertured to receive securing screws so that the heads of the screws are visible after the installation is completed. The present structure provides for concealment of the mounting screws which secure it to the wall or molding, and employs only a single retaining or fastening screw which can be located inconspicuously in the fixture where it will ordinarily be out of sight. As a result, the devices constructed in accordance with this invention can be given a smooth, ornamental appearance with surfaces unbroken by screw-holes or screw-heads, rendering them easy to clean and to keep in sanitary and sightly condition, and insuring a greater durability of the surface finish.

As an example of this type of construction the drawings show a soap dish 1, but it may be understood that this portion of the construction may be varied in accordance with the use to which the article is to be put. As shown, the structure is designed for die casting, and the dish 1 is formed with an integral, rearwardly projecting bracket arm 2 which is hollow and of rectangular cross-section and which extends integrally from a dome-shaped base 3 having a marginal flange portion 4 of rectangular and substantially square outline. At the rear of the base, set inwardly from the edge of the marginal flange 4, there is formed a rearwardly projecting flange 5 at all four sides of the base.

The separable mounting plate 6 includes a rectangular opening 7 which is dimensioned to receive the rearwardly projecting flange 5 of the bracket base, while the edges of the opening 7 will be overlapped by the flange portions 4 when the parts are assembled, as shown in Figure 1. In addition to the rearwardly projecting flanges 5, which serve to position the bracket member in the mounting plate 6, the upper edge of the bracket member includes lugs 8 which extend upwardly at the rear edge of the flange 5, giving these portions of the flange a hook-like formation, and cooperating with the upper flange 4 to form upwardly open channels. The width of these channels is substantially equal to the thickness of the material of the mounting plate 6, which forms the upper edge 7ª of the rectangular opening 7 in the plate. Thus, to assemble the parts the lugs 8, 8 are first entered in the opening 7 in engagement with the rear face of the upper edge 7ª of the opening, seen in Figure 5, and the lower portion of the bracket is then swung into the opening with the projecting flange portions 5 inserted therein.

However, before the parts are thus assembled the mounting plate 6 is first secured to the wall or to a mounting rail, such as that shown at A in Figure 1, by means of screws B extending through screw-holes 9 formed in the back wall 10 of the plate 6. This wall is shown as offset from the front surface of the plate with its rear surface flush with the rear edges 6ª and 6ᵇ which define the main body of the mounting plate 6. Openings in the back wall 10 at 11, 11 leave portions of the edge 7ª of the front wall clear for engagement in the channels formed between the lugs 8 and the the front flange 4 of the bracket member when the parts are assembled after the mounting plate 6 has been secured in place. A boss 12 extends from the lower portion of the back wall 10 within the area of the opening 7, and has an inclined threaded bore to receive a single fastening screw 13 which extends through an aperture 14 in the lower portion of the dome-shaped base 3; preferably, the aperture 14 is counterbored so that the head of the screw 13 fits flush with the surface of the part 3, as seen in Figure 3. This constitutes the final securement of the bracket and the fitting which it supports, such as the soap dish 1; and it will be noted that the mounting screws B are thus wholly concealed by the base 3 and flange 4 of the bracket, while the fastening screw 13 is inconspicuously located in such a position that it is normally hidden from view by the soap dish 1 or other fixture which the bracket 2 supports. Incidentally, the hollow, dome-like formation of the base 3 permits the boss 12 to project beyond the remainder of the front surface of the mounting plate 6 so as to accommodate a threaded bore and fastening screw of ample length to insure proper securement of the parts.

I claim as my invention:

1. A wall bracket comprising a mounting plate formed with a recess in its outer face, the back wall of said recess having holes for mounting screws, and an arm having a base formed to fit in said recess resting on the lower side thereof, the upper edge of the recess being undercut and said base having a portion which extends upwardly into sliding engagement with under-cut portion of the mounting plate when the base is fitted into the recess, said base having also a marginal flange overlapping the edge of the recess together with a securing screw extending through said base into the mounting plate.

2. A wall bracket comprising a comparatively flat mounting plate formed with a recess in its outer face, the back wall of said recess having holes for mounting screws and a portion of said back wall being cut away, forming an opening adjacent the upper edge of the recess, said upper edge being under-cut adjacent said opening, an arm having a base formed to fit in said recess resting on the lower side thereof, said base having an upwardly open, hook-like lug which is accommodated in the said opening and is thus disposed substantially in the plane of the back wall and which engages back of said under-cut edge of the recess, and a securing screw extending through said base into the mounting plate.

WILLIAM A. KENDALL.